US012326693B2

(12) United States Patent
Didier et al.

(10) Patent No.: US 12,326,693 B2
(45) Date of Patent: Jun. 10, 2025

(54) PIEZOELECTRIC BALANCE SPRING, AND METHOD FOR MANUFACTURING THE BALANCE SPRING

(71) Applicant: The Swatch Group Research and Development Ltd, Marin (CH)

(72) Inventors: Alexandre Didier, Erlach (CH); François Gueissaz, Cormondrèche (CH); Elias Laforge, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 321 days.

(21) Appl. No.: 17/939,511

(22) Filed: Sep. 7, 2022

(65) Prior Publication Data

US 2023/0185242 A1 Jun. 15, 2023

(30) Foreign Application Priority Data

Dec. 10, 2021 (EP) .................................... 21213832

(51) Int. Cl.
*G04B 17/06* (2006.01)
*G04B 17/22* (2006.01)

(52) U.S. Cl.
CPC ......... *G04B 17/063* (2013.01); *G04B 17/066* (2013.01); *G04B 17/227* (2013.01)

(58) Field of Classification Search
CPC ... G04B 17/066; G04B 17/063; G04B 17/227
See application file for complete search history.

(56) References Cited

U.S. PATENT DOCUMENTS 3,781,955 A * 1/1974 Lavrinenko .......... G04D 3/0035 29/25.35
6,671,380 B2 * 12/2003 Chang .................... H04R 17/00 381/190
10,969,745 B2 * 4/2021 Haemmerli ............ G04C 3/047
10,983,479 B2 * 4/2021 Haemmerli ............ G04C 3/047
11,619,910 B2 * 4/2023 Tombez ............... G04B 17/222 368/171

(Continued)

FOREIGN PATENT DOCUMENTS

CH 714 144 A1 3/2019
CN 101546965 A 9/2009

(Continued)

OTHER PUBLICATIONS

European Search Report for 21213832 dated Apr. 30, 2022.

*Primary Examiner* — Edwin A. Leon
*Assistant Examiner* — Jason M Collins
(74) *Attorney, Agent, or Firm* — Sughrue Mion, PLLC

(57) ABSTRACT

A piezoelectric balance spring (3) for a circuit (10) for self-regulating an oscillation frequency of an oscillating mechanical system (2, 3), or an energy recovery circuit or a motor circuit for actuating the movement or for the automatic maintenance thereof. The piezoelectric balance spring (3) includes at least one piezoelectric layer (7, 7', 17, 17', 27, 27') provided on a top face (20) or bottom face of a certain number of coils of the spring in a plane, and at least two pairs of electrodes (8*a*, 8*b*, 8*c*, 8*d*), whereby the electrodes of each pair are provided on two opposing faces of the same piezoelectric layer or respectively two piezoelectric layers so as to apply a reverse bias voltage on each pair of electrodes.

14 Claims, 3 Drawing Sheets

(56) References Cited

U.S. PATENT DOCUMENTS

| | | | | |
|---|---|---|---|---|
| 2013/0051191 A1* | 2/2013 | Schafroth | G04C 3/047 | 368/175 |
| 2013/0107677 A1* | 5/2013 | Willemin | G04C 3/067 | 368/200 |
| 2014/0078870 A1* | 3/2014 | Kobayashi | G04R 20/10 | 310/370 |

FOREIGN PATENT DOCUMENTS

| | | | |
|---|---|---|---|
| EP | 3 457 223 | A1 | 3/2019 |
| JP | 2017-49026 | A | 3/2017 |

* cited by examiner

Fig. 3a
(Prior art)
Fig. 3b
(Prior art)
Fig. 3c
(Prior art)
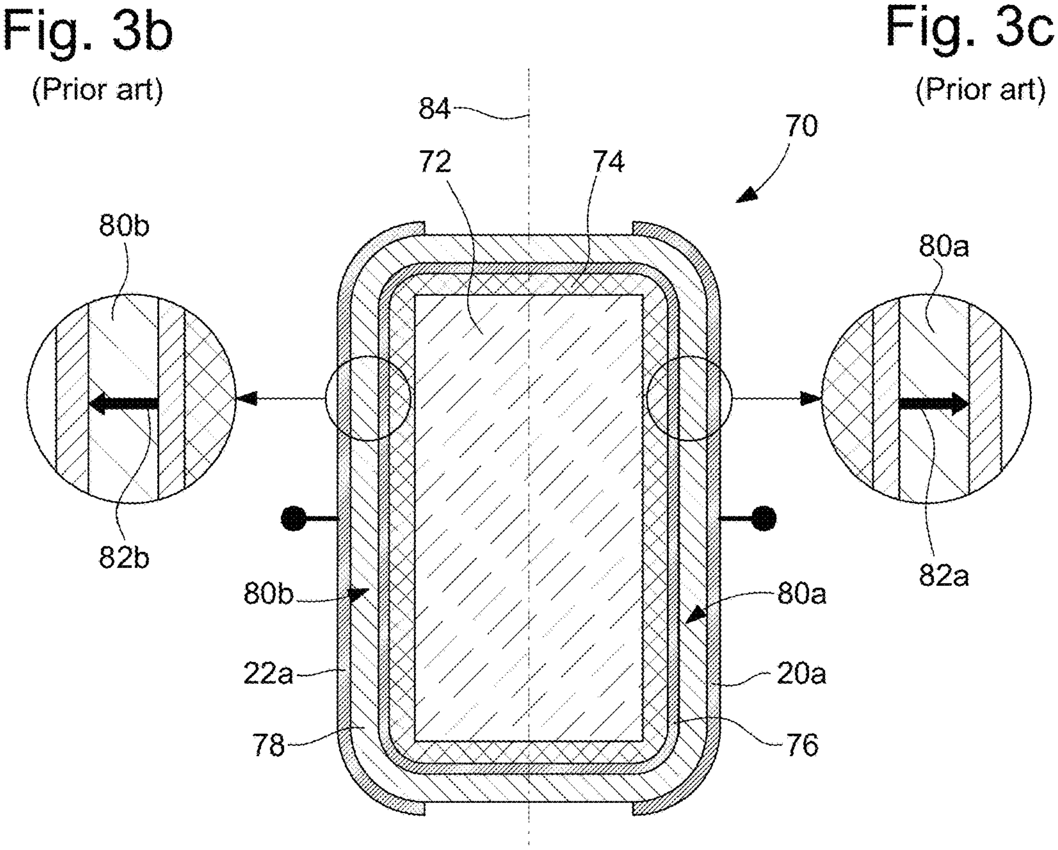
Fig. 4a
Fig. 4b
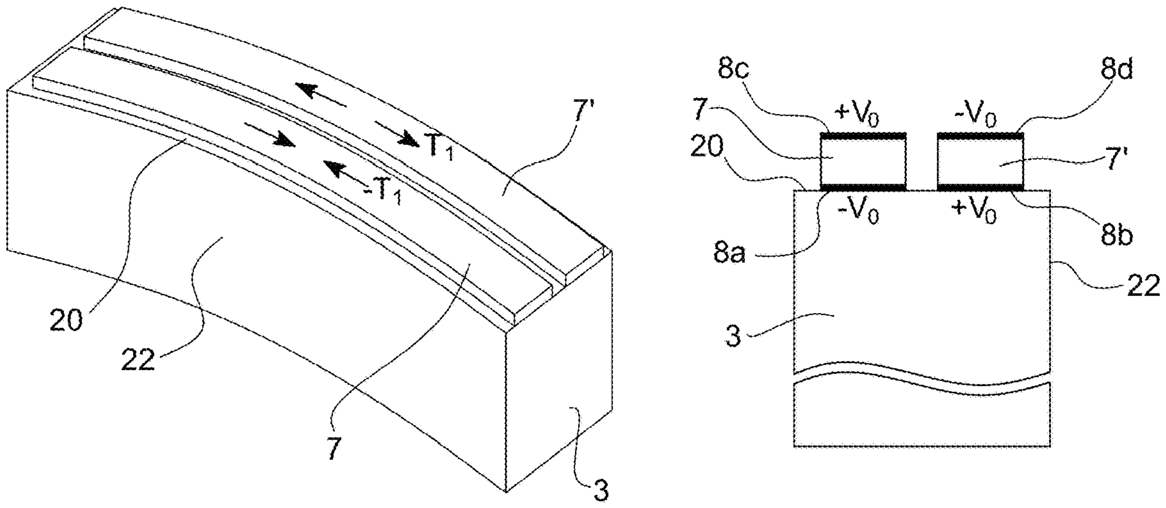

PIEZOELECTRIC BALANCE SPRING, AND METHOD FOR MANUFACTURING THE BALANCE SPRING

CROSS REFERENCE TO RELATED APPLICATION

This application claims priority to European Patent Application No. 21213832.5 filed Dec. 10, 2021, the entire contents of which are incorporated herein by reference.

TECHNICAL FIELD OF THE INVENTION

The invention relates to a piezoelectric balance spring for a circuit for self-regulating the oscillation frequency of an oscillating mechanical system, or an energy recovery circuit or a motor circuit for actuating the movement or for the automatic maintenance thereof.

The invention further relates to a method for manufacturing a piezoelectric balance spring.

PRIOR ART

In the horological field and from a mechanical point of view, the oscillating mechanical system can be a balance on which a balance spring is mounted, one end whereof is attached to the axis of rotation of the balance and the other end whereof is attached to a fixed element of a plate. The mechanical system is kept in oscillation by means of a typically mechanical power source, which can be a barrel driving a gear train with an escapement wheel cooperating with a rotating pallet lever. The balance with the balance spring coupled to the escapement can thus form a regulating member of a clock movement. A large amount of space is used in the watch case with this fully mechanical regulation, which can constitute a drawback in some cases.

The French patent No. 2 119 482 describes an oscillating mechanical system of a piezoelectric element. This piezoelectric element is preferably disposed on a balance spring connected to a balance. This is achieved by depositing films of piezoelectric material (PZT) over the majority of the length of the spring and on an inner and outer face of said metal spring. A voltage converter is used to supply an alternating voltage to the piezoelectric element to alternately generate a compression force and an extension force on the spring in order to regulate the oscillation of the balance connected to the balance spring. In this patent document, electrodes are disposed along the length of the spring and on each side face, which can complicate the production thereof and which constitutes a drawback.

FIGS. 1 and 2 of the prior art show a device 1, which comprises an oscillating mechanical system 2, 3 and a circuit 10 for self-regulating the oscillation frequency fosc of the oscillating mechanical system as described in the European patent No. 2 590 035 B1. In a mechanical watch, the oscillating mechanical system comprises a balance 2, which is formed by a metal ring connected, for example, by three arms 5 to an axis of rotation 6, and a balance spring 3, on which a piezoelectric element or an electroactive polymer element is disposed. A first end 3*a* of the balance spring 3 is held fixed by a stud 4 of a balance cock. This balance cock is attached to the plate of the watch movement. A second end 3*b* of the balance spring 3 is attached directly to the axis of rotation 6 of the balance. Piezoelectric or electro-active polymer layers 23, 23' are deposited on two side faces of the metal strip 24, which can complicate the production thereof.

As shown in FIGS. 3*a* to 3*c* of the prior art, the European patent No. 3 629 103 B1 describes a piezoelectric balance spring 70 of a timepiece. The balance spring 70, shown via a cross-section, comprises a central body 72 made of silicon, a silicon oxide layer 74 deposited at the surface of the central body for temperature compensation of the balance spring, a conductive layer 76 deposited on the silicon oxide layer, and a piezoelectric material deposited in the form of a piezoelectric layer 78 on the conductive layer 76. Two electrodes 20*a* and 22*a* are arranged on the piezoelectric layer 78 respectively on the two lateral sides of the balance spring. A first part 80*a* and a second part 80*b* of the piezoelectric layer extend respectively over two lateral sides of the central body 72 and have respective crystallographic structures which are symmetrical with respect to a median plane 84 parallel to these two lateral sides. In the two lateral parts 80*a* and 80*b*, the piezoelectric layer has two same respective piezoelectric polarisation axes 82*a*, 82*b* which are perpendicular to the piezoelectric layer and of opposite directions. The production of such a piezoelectric balance spring structure is complicated and time-consuming, which constitutes a drawback.

In the prior art, several technical difficulties are encountered when producing piezoelectric layers and contact electrodes on a balance spring for example. One problem can be encountered with the shadowing effect, i.e. any deposition of one or more layers leading to thickness gradients. Short circuits can occur at the bottom of the coils due to an insufficient piezoelectric layer thickness. This also leads to restrictions on the dimensions of the balance spring, as a space must be provided between the coils as well as a sufficiently large aspect ratio in order to mitigate the shadowing effect.

In the case of sputtering, the piezoelectric layers can be textured at an angle of several tens of degrees from the normal to the sidewall. This reduces the piezoelectric effect, as only the projection in the direction of the electric field contributes thereto.

It should also be noted that the resonance frequency of the sprung balance is sensitive to the stiffness of the balance spring, which depends on its cube-like thickness. The typical reproducibility of a deposition requires a final frequency setting state after the deposition of the piezoelectric layers. Moreover, material deposits made by sputtering have a thickness that varies by several percent on the surface of the substrates, which makes it difficult to accurately correct the thickness of a deposited layer.

Non-standard manufacturing methods are often used to produce a balance spring, as layers must be deposited on patterned wafers and electrodes must be patterned on the sidewalls without damaging said layers.

SUMMARY OF THE INVENTION

The purpose of the invention is thus to provide an easily producible piezoelectric balance spring for a circuit for self-regulating the oscillation frequency of an oscillating mechanical system in order to precisely regulate the oscillation frequency of the oscillating mechanical system, with a small number of components and in order to overcome the aforementioned drawbacks of the prior art. The piezoelectric balance spring is also intended for an energy recovery circuit or for a motor circuit for actuating the movement or for the automatic maintenance thereof.

For this purpose, the invention relates to a piezoelectric balance spring for a circuit for self-regulating the oscillation frequency of an oscillating mechanical system, or an energy recovery circuit or a motor circuit for actuating the movement or for the automatic maintenance thereof.

One advantage of such a piezoelectric balance spring according to the invention is that it can be easily produced, because the deposition of the piezoelectric layer is easy to control if deposited on a top face or even on a bottom face. It is also easy to increase the thickness of the piezoelectric layers or to increase the length thereof by carrying out the deposition on the top or bottom faces.

Advantageously, the rims of the edges of the coil of the spring, which are likely to cause problems involving cracking of the piezoelectric layer, are not touched; since the entirety is deposited on the top face or on the bottom face, problems with cracking are reduced.

Another advantage of depositing a piezoelectric layer on a top face is that this produces a better, normally-perpendicular crystal orientation on the top face than it does on the side faces where the orientation is inclined. The homogeneity of the deposit on the whole wafer and on each coil is much higher. This does not depend on the space between the individual coils of the balance spring. On the other hand, when depositing a piezoelectric layer on the side faces, the smaller the space between the coils, the more difficult it is to deposit such a layer on these side faces. In this case, there is a shadowing effect for the deposition of the layers on the side faces which can also be too thin and where short circuits can occur with a layer of insufficient thickness. Depositing a piezoelectric layer on a top face is thus advantageous for controlling manufacturing accuracy, and limiting the differences between the designs and reality.

Another advantage is that it is now easier to deposit piezoelectric layers made of materials that are difficult to pattern on the top face than it is on the sides. In general, an overall top-down manufacturing method, comprising the patterning of the layers and the etching and protection of the patterns, is easier than non-standard patterning of the sidewalls of the coils.

To this end, the invention further relates to a method for manufacturing a piezoelectric balance spring, in the manner described herein.

According to the recommended method of the invention, a substrate in the form of a base plate, for example made of SOI (Silicon-on-Insulator), can be used as a first step. The spring can be etched as soon as this first step is complete, as explained in more detail hereinbelow, or the electrodes, the piezoelectric layer and the other electrodes above the piezoelectric layer can be deposited and patterned before the first silicon layer is etched.

BRIEF DESCRIPTION OF THE FIGURES

The purposes, advantages and features of the piezoelectric balance spring for a circuit for self-regulating the oscillation frequency of an oscillating mechanical system, an energy recovery circuit, or a motor circuit for actuating the movement or for the automatic maintenance thereof, and the method for manufacturing the balance spring, will appear more clearly in the following description, which is given on the basis of the non-limiting embodiments shown in the drawings, in which:

FIG. 3*a* shows a cross-section of a coil of another type of piezoelectric balance spring according to the prior art and FIGS. 3*b* and 3*c* show exploded views thereof, FIGS. 4*a* and 4*b* show a three-dimensional, partial view of a coil portion of the piezoelectric balance spring and a cross-section of this coil of a first embodiment of the piezoelectric balance spring according to the invention.

DETAILED DESCRIPTION OF THE INVENTION

Figure 1:
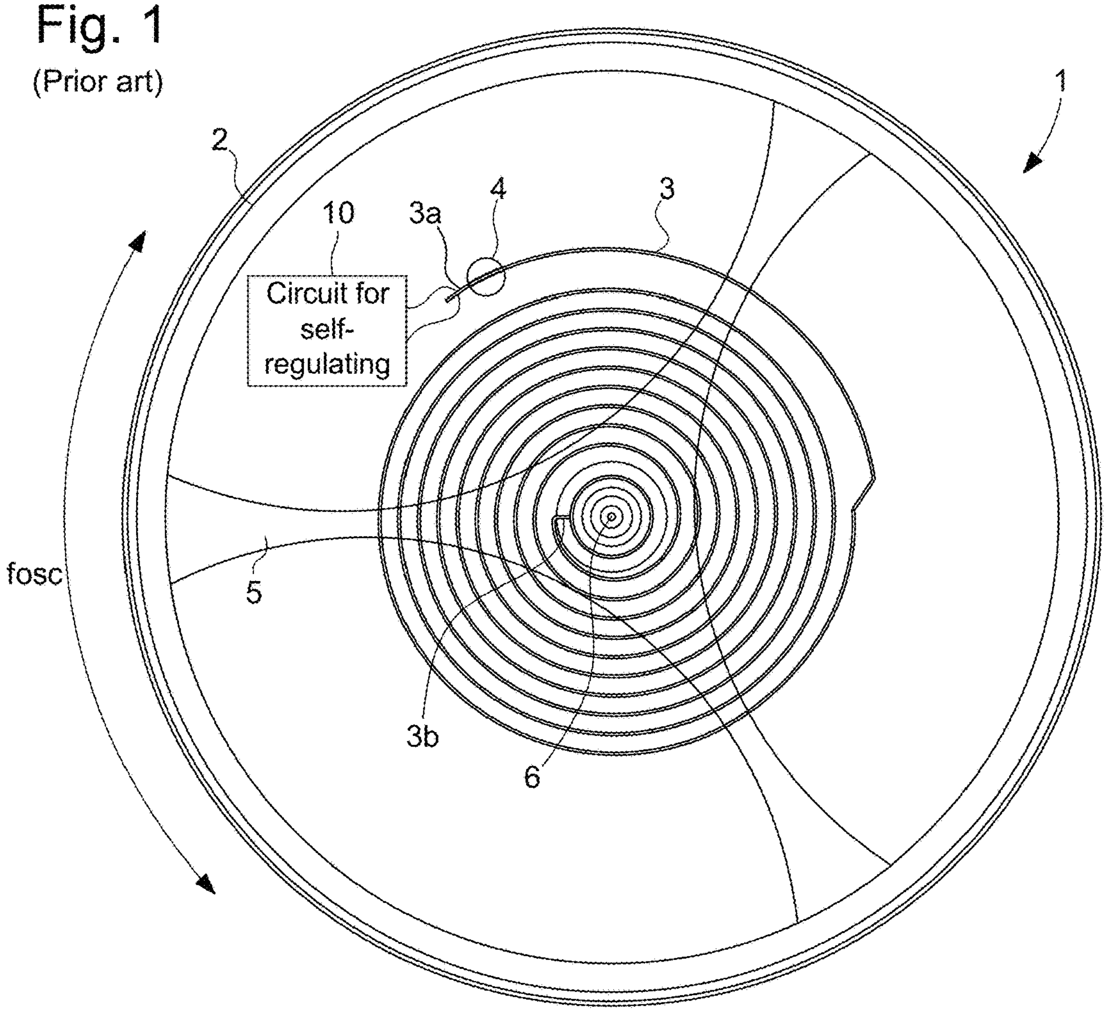
Fig. 1 (Prior art)
FIG. 1 shows, in a simplified manner, a device comprising an oscillating mechanical system and a circuit for self-regulating the oscillation frequency of the oscillating mechanical system according to the prior art.
Figure 2:
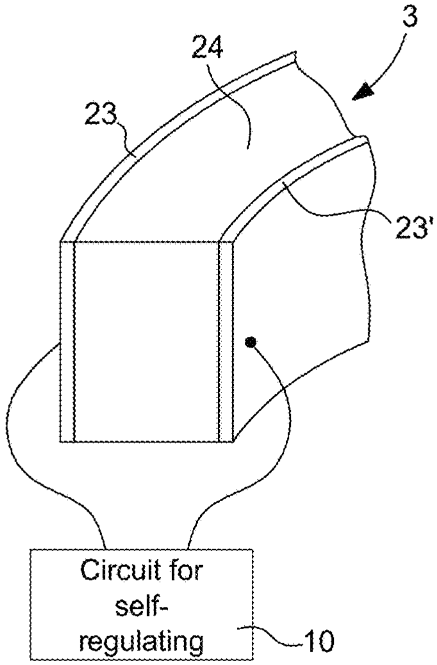
Fig. 2 (Prior art)
FIG. 2 shows a portion of a balance spring of the oscillating mechanical system, which comprises a piezoelectric element of the device according to the prior art.

FIGS. 4*a* and 4*b* show a three-dimensional, partial view of a coil portion of the piezoelectric balance spring 3 and a cross-section of this coil of a first embodiment of the piezoelectric balance spring 3. The balance spring 3 typically comprises a plurality of coils and is connected to a balance (not shown) to form an oscillating mechanical system. A first end of the balance spring is attached to a balance cock, whereas the second end is attached to the balance staff. The balance spring 3 lies in a plane between the two ends thereof.

The piezoelectric balance spring 3 comprises, in this first embodiment, on a top face of the balance spring, two pairs of electrodes 8*a*, 8*b*, 8*c*, 8*d* of which the first electrodes 8*a* and 8*b* of the two pairs of electrodes side by side are attached directly to the top face of the balance spring. The first piezoelectric layer 7 is attached between the first electrode 8*a* and the second electrode 8*c* of the first pair of electrodes, whereas the second piezoelectric layer 7', which is separate from the first layer, is attached between the first electrode 8*b* and the second electrode 8*d* of the second pair of electrodes.

Preferably, the silicon is etched onto a SOI (or quartz) wafer to obtain the shape of the balance spring 3 with the insulator underneath, which comprises on the one hand a SiO2 oxide layer and on the other hand a silicon base plate. The SOI or quartz wafer can advantageously be coated with an insulating layer of the SiO2 type, with a thickness of the order of 500 nm, to avoid any interference between the activation of the piezoelectric layers and the substrate used to produce the balance spring 3. The SOI wafer can have a thickness of the order of 500 μm. According to an alternative embodiment of the method for manufacturing the piezoelectric balance spring, once the contour of the balance spring 3 has been obtained after etching, the deposition and patterning of the electrodes 8*a*, 8*b*, 8*c*, 8*d* and of the piezoelectric layers 7, 7' can be carried out on a top face of the balance spring.

Alternatively, the balance spring 3 can be made on a glass wafer. Under these conditions, a step of laser-assisted chemical etching of the glass wafer is carried out to obtain the balance spring 3. Other types of substrates can be considered, such as ceramics or composites by adapting the manufacturing methods of the balance spring.

The first electrode 8*a* of the first pair of electrodes and the first electrode 8*b* of the second pair of electrodes are disposed or deposited on the top face 20 of the piezoelectric balance spring 3 in a plane. The first electrodes 8*a* and 8*b* are evenly spaced from one another and each take the shape of coils from a first end of the balance spring towards the second end of the balance spring. The first electrodes 8*a* and 8*b* of the two pairs of electrodes are of substantially equal length and on a part of the length of the balance spring from the first end of said balance spring. Preferably, the length of the first electrodes 8*a*, 8*b* of the two pairs of electrodes extends from the first end to a second end of the piezoelectric balance spring 3.

The first piezoelectric layer 7 is deposited directly on the first electrode 8*a* of the first pair and is preferably equivalent in shape to said first electrode 8*a* over at least part of the length of the piezoelectric balance spring 3. The second piezoelectric layer 7' is deposited directly on the first electrode 8*b* of the second pair of electrodes and is preferably equivalent in shape to said first electrode 8*b* over at least part of the length of the piezoelectric balance spring 3.

Finally, the second electrode 8*c* of the first pair of electrodes is disposed or deposited directly on the first piezoelectric layer 7 on a face opposite that of the contact between the first electrode 8*a* and the first piezoelectric layer 7. The second electrode 8*d* of the second pair of electrodes is disposed or deposited directly on the second piezoelectric layer 7' on a face opposite that of the contact between the first electrode 8*b* and the second piezoelectric layer 7'. The shape and length of each second electrode 8*c*, 8*d* are equivalent to the shape and length of each first electrode 8*a*, 8*b* in this first embodiment.

Two alternative embodiments of the method for manufacturing the piezoelectric balance spring are provided. As the balance spring 3 is made from a silicon (SOI) wafer or a quartz wafer, the silicon or quartz can firstly be etched to obtain the base of the balance spring 3. Subsequently, the electrodes 8*a*, 8*b*, 8*c*, 8*d* and the piezoelectric layers 7, 7' are deposited on a top or bottom face of the already patterned balance spring 3. In the case of a glass wafer, the base of the balance spring 3 can firstly be cut from the top of the wafer by chemical-assisted laser cutting or other laser cutting method.

According to an alternative embodiment, the electrodes 8*a*, 8*b*, 8*c*, 8*d* and the piezoelectric layers 7, 7' can be deposited on the silicon or quartz wafer before patterning, i.e. before etching using a DRIE method to obtain the balance spring or before a top-down laser-assisted chemical etching of the glass wafer to obtain the balance spring 3. Further details of the method for manufacturing the piezoelectric balance spring 3 according to the two alternative embodiments briefly described will be given later in the description.

As shown in FIG. 4*a*, the self-regulating circuit allows a matching voltage to be applied in order to generate a compression force −T1 on a piezoelectric layer 7 or a reverse matching voltage on the other piezoelectric layer 7' generating an extension force T1 continuously or in specific time periods. This allows the oscillation frequency of the oscillating mechanical system to be regulated.

Firstly, a first electrode 8*a* of a first pair of electrodes and a first electrode 8*b* of a second pair of electrodes are both disposed or patterned on a top face 20 and preferably over a large part of the length of the balance spring 3, at least half of the length thereof, and for example over the entire length of the balance spring 3 if it has already been produced from the wafer. The first electrodes 8*a* and 8*b* are disposed next to one another with a predefined spacing, for example along the entire length of the balance spring 3. No electrode is deposited on each side face 22.

A first piezoelectric layer 7 is then deposited and patterned on the first electrode 8*a* of the first pair of electrodes. Preferably, the first piezoelectric layer is patterned to the lateral dimension and length of the first electrode 8*a* of the first pair of electrodes. A second piezoelectric layer 7' can be deposited or patterned on the first electrode 8*b* of the second pair of electrodes at the same time as the first piezoelectric layer 7 or after the first piezoelectric layer 7 has been produced. Preferably, the second piezoelectric layer 7' is patterned to the lateral dimension and length of the first electrode 8*b* of the second pair of electrodes.

Once the first and second piezoelectric layers 7, 7' have been properly patterned on the first electrodes 8*a*, 8*b* of the two pairs of electrodes, a second electrode 8*c* of the first pair of electrodes is deposited or patterned on the first piezoelectric layer 7 facing the first electrode 8*a* of the first pair of electrodes. The second electrode 8*c* is of the same shape and dimensions as the first electrode 8*a* of the first pair of electrodes. A second electrode 8*d* of the second pair of electrodes is deposited or patterned on the second piezoelectric layer 7' facing the first electrode 8*b* of the second pair of electrodes. The second electrode 8*d* is of the same shape and dimensions as the first electrode 8*b* of the second pair of electrodes.

Once the piezoelectric balance spring 3 is complete, it can be mounted in an oscillating mechanical system. The two pairs of electrodes in this embodiment are inversely and alternately biased by a voltage source, in particular to maintain a movement of the oscillating system for the oscillation of the piezoelectric balance spring. For this purpose, the first electrode 8*a* of the first pair of electrodes can be connected to the second electrode 8*d* of the second pair of electrodes. The first electrode 8*b* of the second pair of electrodes can be connected to the second electrode 8*c* of the first pair of electrodes. The first electrode 8*a* and the second electrode 8*d* can be connected to a first connection terminal disposed at a first end of the piezoelectric balance spring 3. The first electrode 8*b* and the second electrode 8*c* can be connected to a second connection terminal at the first end of the piezoelectric balance spring 3.

It should also be noted that it is possible to deposit only a first piezoelectric layer 7 on the two first electrodes 8*a*, 8*b* of the two pairs of electrodes. After this, separation into two piezoelectric layers 7, 7' can be carried out as described for each first electrode 8*a*, 8*b* of the two pairs of electrodes.

The electrical connection of the piezoelectric balance spring 3 can be made from the top, with connection terminals defined in particular at the same time as the deposition of the electrodes 8*a*, 8*b*, 8*c*, 8*d* and of the one or more piezoelectric layers 7, 7'. Preferably, two connection terminals at a first end of the piezoelectric balance spring 3 are provided for connection to the electrodes 8*a*, 8*b*, 8*c*, 8*d* of at least two pairs of electrodes. The connection terminals are disposed after the balance stud, so as not to mechanically affect the sprung balance. A resistive layer of the SiO2 type is deposited at least locally on the area where the balance spring is attached to the stud, so as to avoid any electrical short-circuit. An insulated stud can also be used. However, it is also possible to directly use the balance stud to make the electrical connections.

As mentioned hereinabove, in order to reverse bias the two pairs of electrodes, the electrodes 8*a* and 8*d* are connected to a first terminal, for example denoted Vo−, whereas the electrodes 8*b* and 8*c* are connected to a second terminal, for example denoted Vo+. The voltages Vo+ and Vo− are time-dependent alternating voltages with rectangular or sinusoidal signals or pulse trains to maintain the oscillation of the piezoelectric balance spring 3.

It should also be noted that voltages of different amplitudes can be applied for each pair of electrodes to compensate for possible asymmetries, for example a voltage V0 for the first pair of electrodes 8*a* and 8*c* and a reverse voltage V1 of a different amplitude to V0 on the second pair of electrodes 8*b* and 8*d*. Under these conditions, four connection terminals, each connected to a respective electrode of the two pairs of electrodes, must be provided at a first end of the piezoelectric balance spring 3.

Figure 5:
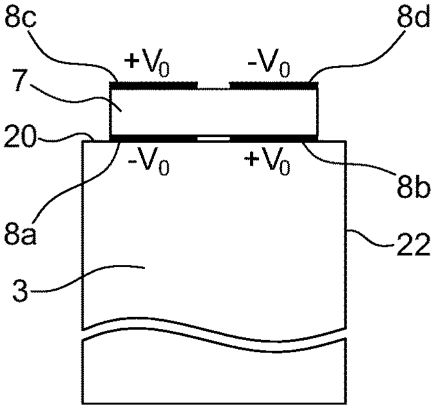
FIG. 5 shows a cross-section of a coil of a second embodiment of the piezoelectric balance spring according to the invention.

The piezoelectric balance spring 3, which is shown in FIG. 5, has similar features to those shown in FIG. 4*b*. However, in this second embodiment of the piezoelectric balance spring 3, only one piezoelectric layer 7 is deposited and maintained on the two first electrodes 8*a*, 8*b*. A second electrode 8*c*, 8*d* for each pair of electrodes is deposited on the piezoelectric layer 7 facing each respective first electrode 8*a*, 8*b* of the pairs of electrodes. However, the piezoelectric layer 7 is deposited both over the width of the two first electrodes 8*a* and 8*b* and over the space therebetween. The shape and dimensions of the piezoelectric layer 7 are equivalent to the combined shape of the two first electrodes 8*a* and 8*b*, including the space therebetween.

Figure 8:
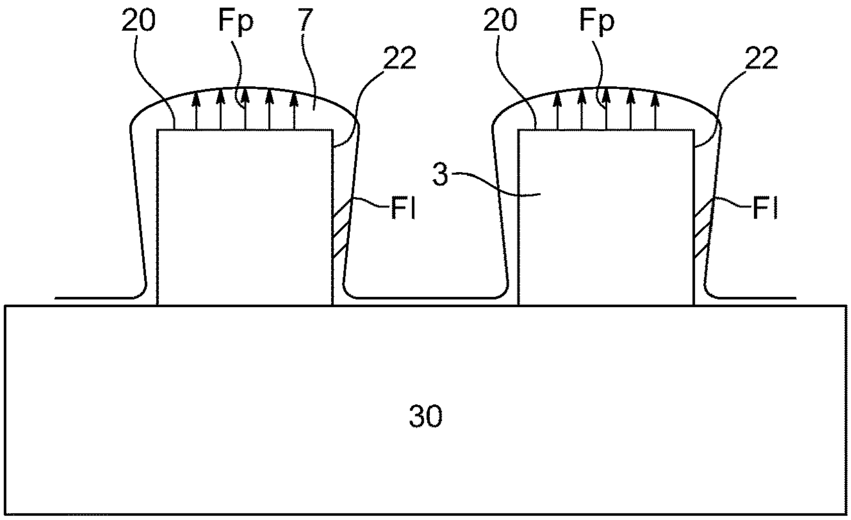
FIG. 8 shows a formation of coils of the piezoelectric balance spring on a substrate base and with a piezoelectric layer coating on the coils to define the difference between the layer deposited on a top face, according to the present invention, and a layer on a side face.

The crystal orientation of the piezoelectric layer 7 deposited on the top face 20 of the balance spring 3 provides a much better result than layers deposited laterally on side faces 22 of the balance spring. As shown in FIG. 8, the crystal orientation of the layer deposited on the side faces 22 is inclined and thus not perpendicular like the crystal orientation of the piezoelectric layer deposited on the top face 20 of the balance spring.

The second electrode 8*c* of the first pair of electrodes is arranged to receive the voltage Vo+, whereas the first electrode 8*a* of the first pair of electrodes is arranged to receive the voltage Vo− which is the inverse of the voltage Vo+. The second pair of electrodes is arranged to be reverse biased relative to the first pair of electrodes with the voltage Vo+ supplied to the first electrode 8*b* of the second pair of electrodes, whereas the second electrode 8*d* of the second pair of electrodes is arranged to be biased by the voltage Vo−. However, the bias voltage supplied to the electrodes 8*a*, 8*b*, 8*c*, 8*d* from the two connection terminals is alternating. The electrodes 8*b* and 8*c* are thus alternately biased in time by the voltage Vo+, whereas the electrodes 8*a* and 8*d* are alternately biased in time by the voltage Vo−, which is the inverse of the voltage Vo+ to maintain a movement of the oscillating system for the oscillation of the piezoelectric balance spring 3. It goes without saying that the bias voltages of the electrodes can be varied by rectangular or sinusoidal signals.

Finite element calculations show that with this configuration, the balance spring 3 can be excited in a similar way to that of deposition on the side faces 22 of the balance spring. Even if the piezoelectric effect achieved with this method is lower than for deposition on the side faces 22, this can be compensated by using materials with higher piezoelectric factors, which cannot necessarily be successfully deposited on the side faces 22 of the balance spring 3. The method is in particular compatible with all piezoelectric materials that can be deposited by sputtering (AlN, AlScN, PZT, and lead-free piezoelectric materials). Two alternative embodiments of the manufacturing method are considered and described hereinbelow.

Figure 6:
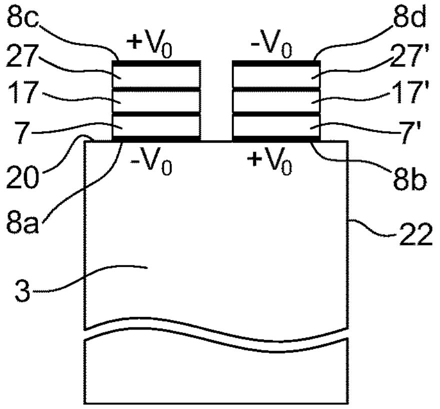
FIG. 6 shows a cross-section of a coil of a third embodiment of the piezoelectric balance spring according to the invention.

FIG. 6 shows a cross-section of a coil of the piezoelectric balance spring 3 according to a third embodiment. As with the first embodiment, at least two pairs of electrodes are provided, of which a first electrode 8*a* of the first pair of electrodes is disposed in contact with the top face 20 of the piezoelectric balance spring 3 and a second electrode 8*c* of the first pair of electrodes is disposed on a first set of composite layers 7, 17, 27, including at least one piezoelectric layer 7, which can be one of the layers from the first layer to the last layer of the first set of composite layers. A first electrode 8*b* of the second pair of electrodes is disposed on the top face 20 of the coil, whereas the second electrode 8*d* of the second pair of electrodes is disposed on a second set of composite layers 7', 17', 27', including at least one piezoelectric layer 7', which can be one of the layers from the first layer to the last layer of the second set of composite layers.

The layers of the first set of composite layers and of the second set of composite layers can be disposed in series or in parallel between the two electrodes 8*a* and 8*c* of the first pair of electrodes or the two electrodes 8*b* and 8*d* of the second pair of electrodes. Intermediate electrodes can also be provided between each layer of the set of composite layers in order to connect the layers in series or parallel or to short-circuit one or more layers depending on the desired selection. It can also be a functional layer rather than a piezoelectric layer only, where each layer of the set of composite layers can be made of a different material from the next layer or from the other layers provided.

Figure 7:
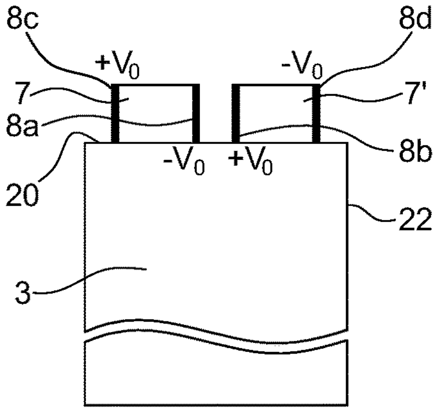
FIG. 7 shows a cross-section of a coil of a fourth embodiment of the piezoelectric balance spring according to the invention.

Finally, the fourth embodiment is shown in FIG. 7 and compared to FIG. 4*b*. Two pairs of electrodes are provided, but with different orientations for the first and second electrodes 8*a* and 8*c* of the first pair of electrodes and for the first and second electrodes 8*b* and 8*d* of the second pair of electrodes. Preferably in this fourth embodiment, the first piezoelectric layer 7 and subsequently or simultaneously the second piezoelectric layer 7' are produced on the top face 20. Subsequently, the first and second electrodes 8*a*, 8*c* and 8*b*, 8*d* of the two pairs of electrodes are deposited on two opposite side faces of each piezoelectric layer 7, 7'.

A first piezoelectric layer 7 is disposed and biased by the first and second electrodes 8*a*, 8*c* of the first pair of electrodes vertically to the top face 20. Moreover, a second piezoelectric layer 7' is disposed and biased by the first and second electrodes 8*b*, 8*d* of the second pair of electrodes. The crystal orientation can be disposed parallel to the top face 20 in contrast to the second or previous embodiments. However, the production of the fourth embodiment is more complicated than the previous embodiments.

According to all of the above embodiments, each piezoelectric layer or electrode is deposited on the top face 20, although it can be deposited on the bottom face (not shown). Moreover, other piezoelectric materials can be used, even if they do not lead to a satisfactory deposition on the side faces 22 because in the present invention, deposition is carried out on the top face of the wafer or directly on the top face 20 of the piezoelectric balance spring 3. Furthermore, there are also no additional limitations regarding the dimensions of the balance spring. The height of the balance spring contributes to the resonance frequency of the sprung balance, in the same way as the length thereof. On the other hand, deposition on the top, in particular the top face 20, is easier to control than on the side faces.

Two alternative embodiments of a method for manufacturing a piezoelectric balance spring 3 using a quartz or SOI wafer and a DRIE method or a glass wafer and a laser-assisted chemical etching method will now be described. All four embodiments of the piezoelectric balance spring 3 can be obtained using the two alternative embodiments of the method for manufacturing the piezoelectric balance spring 3.

As already explained hereinabove and according to a first alternative embodiment of the method for manufacturing the piezoelectric balance spring 3, the base of the balance spring 3 is firstly produced by top-down DRIE of the SOI or Quartz wafer or by pulsed laser or laser-assisted chemical etching of the glass wafer. More conventionally, the balance spring can be produced first, before the piezoelectric layers or electrodes required to make the piezoelectric balance spring are deposited.

In the case of sputtering, in particular of the piezoelectric layers 7, 7' such as AlN or AlScN or PZT, as well as lead-free piezoelectric materials such as KNN (solid solution formed from Potassium Niobate (KNbO3, KN) and Sodium Niobate (NaNbO3, NN), the piezoelectric layers can be textured at an angle of several tens of degrees from the normal on the side faces 22 of the balance spring 3. This reduces the piezoelectric effect, as only the projection in the direction of the electric field contributes thereto.

However, the use of the piezoelectric material KNN can be advantageous if it is deposited on the top face 20 of the balance spring 3, as it can be deposited at a sufficient thickness of, for example, 5 μm without great difficulty.

In a first series of steps of the manufacturing method of the second alternative embodiment, piezoelectric layers or electrodes of the programmed shape and length can firstly be produced on a top face of the SOI or quartz wafer, after which the piezoelectric balance spring can be obtained. Once the set of electrodes connected to the piezoelectric layers has been obtained on the top face 20 of the SOI, Quartz or glass wafer, the balance spring can be etched or patterned, in particular to a certain etching depth of the balance spring. In the final production steps, the base of the SOI wafer is also removed by DRIE (deep reactive ion etching). The piezoelectric balance spring is obtained at this point and already includes the arrangement of the electrodes and the piezoelectric layers on the top face 20 of the balance spring.

When using the piezoelectric balance spring 3 to draw power or to power a motor circuit, a larger and longer balance spring may be required.

It should also be noted that a larger piezoelectric surface area implies a greater amplitude of movement at equivalent voltages. This is generally beneficial for a motor. However, it is possible to work at higher frequencies of a few hundred Hz and smaller amplitudes, with the appropriate gear ratios. In such a case, a balance spring of similar overall dimensions can be used. Conversely, fewer parts can be used in the watch, for example a higher barrel level or a smaller barrel. The typical external diameter of a motor balance spring with wide coils would be of the order of 7 mm compared to about 5 mm for a conventional chronometric balance spring. It is clear that this remains smaller than the diameter of the balance.

The thickness of the piezoelectric layers can be easily increased, or the length of the spring itself can be easily increased, for example in order to adapt the oscillation frequency. However, the rims of the edges of the coil capable of leading to cracking problems are not touched. It is much easier to arrange the piezoelectric layers on one of the top or bottom faces. The length of the balance spring must be increased if the thickness thereof is increased, in order to keep the same resonance or oscillation frequency. Another consequence is that layers can be added to a balance spring in this way with little or no change to the geometry thereof. The effect of a deposition on the side faces is much greater and requires a greater adjustment of the geometry of the balance spring.

It can also be pointed out that it is easier to use piezoelectric materials that are difficult to pattern on side faces or that can require co-deposition of a plurality of different materials, for example AlScN when a pre-mixed target is not available.

Another advantage is that the top face has a better perpendicular crystal orientation, whereas the side faces have an inclined crystal orientation. The homogeneity of the deposit on the whole wafer and on each coil is much higher.

By way of comparison, the thickness of the deposit on the side faces of the balance spring also depends on the spacing between the coils of the spring, which relates to the shadowing effect described hereinabove. The closer the coils, the smaller the thickness deposited on the side faces and the greater the thickness gradient on the side face. In the case of top-down deposition, the thickness of the piezoelectric layer will be almost identical on each coil. This is an advantage in terms of controlling the manufacturing accuracy and limits the difference between the designs produced and the reality.

The number of pairs of electrodes used is not limited to two. For example, three or four pairs of electrodes could be used. With several pairs of electrodes, different voltage sequences can be applied to the layers, for example electrical excitation of the central pairs to correct the drift on the amplitude of the watch and energy recovery or collection on the two outer pairs.

Alternatively, an odd number of pairs of electrodes can be used, for example three pairs with the central pair to be used only as a collector, and the outer layers to act on the balance spring. In this way, different correction circuits can be used, with direct feedback depending on the information gathered on the central layer.

For either the first or second alternative embodiment of the method, the final step of the method can be to remove the base silicon plate forming a part of the insulator. Subsequently, the silicon balance spring can be connected to a circuit for self-regulating the oscillation frequency, to an energy recovery circuit or to a motor circuit for actuating the movement or for the automatic maintenance thereof. Moreover, it can be connected to a printed circuit board for connection to other system components. The two connection terminals at one end of the piezoelectric balance spring are connected to at least two pairs of electrodes 8*a*, 8*b*, 8*c*, 8*d* disposed on the top face 20 of the piezoelectric balance spring 3. The electrodes 8*a* and 8*d* are connected to a first connection terminal, whereas the electrodes 8*b* and 8*c* are connected to a second connection terminal.

As mentioned hereinabove, by producing the electrodes and the piezoelectric layers on the top face, it is easy to increase the thickness or even the length of the piezoelectric layers on the balance spring. It can easily be made up to 3 μm thick on the top, whereas on the sides only 1 μm can be controlled. These values correspond to the use of AlN as a piezoelectric layer. Some other materials, such as KNN, can be deposited up to 5 μm. Some difficulties can arise with the patterning, but not with the use of such materials with higher piezoelectric factors.

It should be noted that the electrodes of the two pairs of electrodes and the piezoelectric layer could extend over only a first coil of the balance spring from a first end of the balance spring where the connection terminals are located. This is advantageous for a low power self-regulating circuit.

Moreover, the dimensions and mainly the width of the electrodes and of the piezoelectric layers successively deposited on the top face of the balance spring can vary slightly by a few μm as a result of the manufacturing method. Thus each first electrode deposited directly on the top face can be slightly wider than the second electrode deposited on the layer.

From the description which has just been given, several other embodiments of the piezoelectric balance spring can be produced without departing from the scope of the invention defined by the claims. Two piezoelectric layers made of different materials can be used on the top face of the piezoelectric balance spring.

The invention claimed is:

1. A piezoelectric balance spring (3) comprising:

at least one piezoelectric layer (7, 7', 17, 17', 27, 27') deposited on a top face (20) or bottom face of coils of the spring in a plane, and at least two pairs of electrodes (8*a*, 8*b*, 8*c*, 8*d*), wherein the electrodes of each pair are disposed on the same side as two opposing faces of at least one piezoelectric layer (7) or respectively two separate piezoelectric layers (7, 7') so as to apply a reverse bias voltage on each pair of electrodes.

2. The piezoelectric balance spring (3) according to claim 1, wherein the first electrode (8*a*) of the first pair of electrodes is connected to the second electrode (8*d*) of the second pair of electrodes, and wherein the second electrode (8*c*) of the first pair of electrodes is connected to the first electrode (8*b*) of the second pair of electrodes.

3. The piezoelectric balance spring (3) according to claim 1, wherein the first electrode (8*a*) of the first pair of electrodes and the second electrode (8*d*) of the second pair of electrodes are connected to a first connection terminal at a first end of the piezoelectric balance spring (3), and wherein the first electrode (8*b*) of the second pair of electrodes and the second electrode (8*c*) of the first pair of electrodes are connected to a second connection terminal at the first end of the piezoelectric balance spring (3).

4. The piezoelectric balance spring (3) according to claim 1, wherein all of the electrodes (8*a*, 8*b*, 8*c*, 8*d*) of the two pairs of electrodes are each connected to a respective connection terminal at a first end of the piezoelectric balance spring (3).

5. The piezoelectric balance spring (3) according to claim 1, wherein the first electrode (8*a*) of the first pair of electrodes is deposited directly on the top face (20) of the piezoelectric balance spring (3), wherein the first electrode (8*b*) of the second pair of electrodes is deposited directly on the top face (20) of the piezoelectric balance spring (3), and wherein the first electrodes (8*a*; 8*b*) of the two pairs of electrodes are evenly spaced from one another and each take the shape of coils from a first end of the balance spring (3) towards a second end of the balance spring (3).

6. The piezoelectric balance spring (3) according to claim 5, wherein the first electrodes (8*a*; 8*b*) and the second electrodes (8*c*; 8*d*) of the two pairs of electrodes extend from the first end of the balance spring (3) to more than halfway along at full length of the piezoelectric balance spring (3).

7. The piezoelectric balance spring (3) according to claim 5, wherein a first piezoelectric layer (7) is deposited on the first electrode (8*a*) of the first pair of electrodes, wherein a second piezoelectric layer (7') is deposited on the first electrode (8*b*) of the second pair of electrodes, and wherein a shape and dimensions of the first piezoelectric layer (7) are identical to the shape and dimensions of the first electrode (8*a*) of the first pair of electrodes, and wherein the second piezoelectric layer (7') is identical to the shape and dimensions of the first electrode (8*b*) of the second pair of electrodes.

8. The piezoelectric balance spring (3) according to claim 1, wherein the first electrodes (8*a*; 8*b*) and the second electrodes (8*c*; 8*d*) of the two pairs of electrodes and the piezoelectric layer (7) extend from a first end of the balance spring (3) over a first coil of the balance spring (3).

9. The piezoelectric balance spring (3) according to claim 1, wherein a first electrode (8*a*) of the first pair of electrodes is deposited directly on the top face (20) of the piezoelectric balance spring (3), wherein a first electrode (8*b*) of the second pair of electrodes is deposited directly on the top face (20) of the piezoelectric balance spring (3), and wherein a piezoelectric layer (7) is deposited on the two first electrodes (8*a*; 8*b*) both over at width of the two first electrodes (8*a*; 8*b*) and over a space therebetween.

10. The piezoelectric balance spring (3) according to claim 1, wherein a first electrode (8*a*) of the first pair of electrodes is disposed in contact with the top face (20) of the piezoelectric balance spring (3) and a second electrode (8*c*) of the first pair of electrodes is disposed on a first set of composite layers (7, 17, 27) mounted on the first electrode (8*a*) of the first pair of electrodes, at least one layer whereof is a piezoelectric layer (7), and wherein a first electrode (8*b*) of the second pair of electrodes is disposed on the top face (20) of the piezoelectric balance spring (3), whereas the second electrode (8*d*) of the second pair of electrodes is disposed on a second set of composite layers (7', 17', 27') mounted on the first electrode (8*b*) of the second pair of electrodes, at least one layer whereof is a piezoelectric layer (7').

11. The piezoelectric balance spring (3) according to claim 10, wherein intermediate electrodes are provided between each layer of each set of composite layers (7, 7', 17, 17', 27, 27') in order to connect the layers in series or parallel or to short-circuit one or more layers.

12. The piezoelectric balance spring (3) according to claim 1, wherein a first piezoelectric layer (7) is deposited on a top face (20) of the piezoelectric balance spring (3), wherein a second piezoelectric layer (7') is deposited on the top face (20) of the piezoelectric balance spring (3), spaced apart from the first piezoelectric layer (7), wherein a first electrode (8*a*) of the first pair of electrodes is disposed on a side face of the first piezoelectric layer (7), whereas a second electrode (8*c*) of the first pair of electrodes is disposed on an opposing side face of the first piezoelectric layer (7), wherein a first electrode (8*b*) of the second pair of electrodes is disposed on a side face of the second piezoelectric layer (7'), whereas a second electrode (8*d*) of the second pair of electrodes is disposed on an opposing side face of the second piezoelectric layer (7').

13. A method for manufacturing the piezoelectric balance spring (3) according to claim 1, on a base of a SOI wafer (30), a quartz wafer or a glass wafer, wherein a base of the balance spring (3) is firstly produced by top-down DRIE of the SOI or Quartz wafer, or by top-down laser-assisted chemical etching of the glass wafer, and wherein once a shape of the balance spring (3) has been produced having left the base (30) of the wafer or having completely removed the base (30) of the wafer, by DRIE or by laser-assisted chemical etching, one or more piezoelectric layers (7, 7') are deposited on the top face (20) of the balance spring (3) and the first and second electrodes (8*a*, 8*b*, 8*c*, 8*d*) of the two pairs of electrodes, combined with the one or more piezoelectric layers (7, 7') are deposited.

14. The method for manufacturing a piezoelectric balance spring (3) according to claim 13, on the base of a SOI wafer (30), a quartz wafer or a glass wafer, wherein this is carried out directly on a rough top face of the SOI wafer (30), quartz wafer or glass wafer, the deposits of one or more piezoelectric layers (7, 7') taking on a shape and length of coils and the deposits of the first and second electrodes (8*a*, 8*b*, 8*c*, 8*d*) of the two pairs of electrodes taking on the shape and length of coils combined with the one or more piezoelectric layers (7, 7'), and wherein once the electrodes (8*a*, 8*b*, 8*c*, 8*d*) of each pair of electrodes have been disposed on two opposing faces of one or two piezoelectric layers (7, 7') or of one or two sets of composite layers (7, 7', 17, 17', 27, 27') on the rough top face (20), a top-down DRIE operation is carried out on the SOI or quartz wafer of the balance spring (3), or a top-down laser-assisted chemical etching operation is carried out on the glass wafer, according to an overall length and shape, and wherein a final DRIE operation or laser-assisted chemical etching operation is carried out to entirely remove the base (30) of the wafer in order to obtain a final piezoelectric balance spring (3).

* * * * *